UNITED STATES PATENT OFFICE 2,637,644

PLANT GROWTH REGULATION

Nathaniel Tischler, Palmyra, N. J., and Ernest P. Bell, Detroit, Mich., assignors to Sharples Chemicals Inc., a corporation of Delaware No Drawing. Application October 31, 1951, Serial No. 254,189

13 Claims. (Cl. 71—2.5)

The present invention pertains to oxygen-bridged, hydrogenated derivatives of phthalmic acid.

More particularly, the invention pertains to 3,6-endoxohexahydrophthalmic acids of exo-cis isomeric configuration and having structures defined by the formula

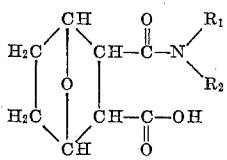

in which $R_1$ and $R_2$, taken individually, represent one of the group consisting of hydrogen and alkyl, alkanol, and cycloalkyl radicals, and taken collectively, represent one of the group consisting of polymethylene and oxapolymethylene radicals.

The invention likewise pertains to salts of such acids, as well as to processes for preparing said acids and salts.

The invention also pertains to improved methods and compositions for treating growing plants whereby the normal life cycle of a plant is altered with advantageous results, such compositions containing as essential active ingredient, at least one compound of the foregoing character.

The invention is concerned with the exo-cis isomeric form of the compounds, and for convenience in description and to avoid repetition all references made herein to compounds of the invention are to be construed as meaning the exo-cis form.

The compounds of this invention are unusually versatile, first, with respect to the types of plant response which they are capable of inducing, second, with respect to the types of plants upon which they exert useful effects, and third, with respect to the forms in which they may be used, the latter including, for example, the acids themselves as well as other forms which when in the presence of water yield anions of the acids, such as the water-soluble salts of the acids.

For example, these compounds may bring about such effects as leaf abscission (partial or complete), blossom thinning, vine-kill, total destruction of the plant, or adventitious root formation, the particular plant response manifested depending to a large extent upon the applied concentration of the response agent, technique of application, and the species and degree of maturity of the plant undergoing treatment. The term plant as used herein is understood to include all portions of the plant, such as the roots, stems, leaves, blossoms, seeds, and fruits.

While under suitable conditions any of the foregoing effects may be induced, depending upon the conditions of treatment, the treatment is particularly outstanding in the accelerated induction of plant physiological effects such as defoliation, or such as selective or non-selective killing of plants, and for convenience will be described more particularly with reference thereto. Induced defoliation is the hastened abscission of foliage, brought about by causing certain accelerated physiological effects in certain plants which usually defoliate normally at some stage of their life cycle, such as, at the onset of the winter season; whereas plant kill is a drastic phytotoxic effect of importance in the extermination of dicotyledonous weeds (usually broadleafed plant species) and of monocotyledonous weeds (including various species of grasses), etc.

It is well known that the presence of excessive foliage at the time of harvesting is undesirable in the case of many crops among which may be mentioned cotton, potatoes, tomatoes, and beans such as soybeans and lima beans. This is particularly true if the crop is to be harvested mechanically. Controlled defoliation greatly facilitates harvesting, and in many circumstances also results in marked improvement in the quality and/or ripening time of the product. Furthermore, the elimination of foliage, after it has served its primary purpose, may be effective in avoiding or minimizing certain late season blights, and/or other undesirable developments. Early defoliation of nursery stock is often desirable to permit the digging and preparation of the stock for shipment at a more convenient time.

By a defoliant is meant a substance which, upon penetrating, in suitable concentration, the epidermal layer of a growing plant which normally tends to defoliate during its life cycle (usually after maturity), brings about an accelerated abscission of the leaves without causing complete destruction of the plant. The ultimate goal in defoliation might be considered to be complete abscission of leaves coupled with negligible injury to the rest of the plant insofar as the final maturation of the crop is concerned. A measure of the value of a defoliant, generally speaking, is the extent to which this ultimate objective is attained. For practicable utility, moreover, the defoliating agent (i. e. defoliant) must be effective in relatively low concentration.

The present invention provides an effective and economical means of defoliating plants which undergo seasonal leaf abscission in the course of their normal life cycle. It is of particular value commercially in the defoliation of cotton, Irish potatoes (i. e. the common white potatoes), sweet potatoes, soybeans, tomatoes, and other plants.

This invention also provides an economical and effective means of destroying undesirable vegetation including many species of unwanted herbs, grasses, ferns, etc. In some instances it may be desired to practice selective destruction of the unwanted species, without causing appreciable damage to desirable species growing in the same area, while in other instances it may be desired to destroy all plants growing in a given area. When the plant response agents are employed to kill weeds, it is usually desirable, though not essential, that they be applied to the weeds prior to full maturity, and preferably when said weeds (i. e. objectionable plants) are fairly young. In some instances, moreover, it may be desirable to kill useful crops to control production, and the invention may advantageously be adapted to such objectives.

To prevent germination of weed seeds and to destroy weed seedlings and plants, various practices are followed in accordance with the particular purpose desired.

In the selective prevention or destruction of undesired weed seedlings or plants, three special kinds of practices have been followed: pre-planting treatment, pre-emergence treatment, and post-emergence treatment. By pre-planting treatment is meant the application of either sprays or dusts, but more commonly sprays, to the soil previous to planting of the crop seeds or plants, usually from one to three weeks previously. By preemergence treatment is meant the application of either sprays or dusts, but more commonly sprays, to the soil after the seeds have been planted but before the emergence of the crop seedlings. By post-emergence treatment is meant the application of either sprays or dusts, but more commonly sprays, after the plants have emerged from the soil or after transplanted plants have established themselves. Such post-emergence treatments are usually made while the weed plants are quite small, since in general less chemical is required to destroy young weed plants than fairly mature weeds.

The objective in the case of the pre-planting practice is to destroy weed seeds, weed seedlings, and more fully grown weed plants, before planting the crop seeds or plants so that the herbicidal chemical either will be leached from the soil by rainfall, or will volatilize, if it is one of sufficiently high vapor pressure, or will be decomposed, as for example by microorganisms, in the soil, so that there will be no chance of injury by the chemical to crop plants.

The objective in the case of pre-emergence practice is to destroy young weed seedlings or plants before the crop seeds germinate or before they emerge from the soil.

In the case of post-emergency practice, as a rule, selective herbicidal chemicals must be applied in lower amounts per area than when the same chemicals are applied as pre-emergence agents.

In the practice of the invention there is applied to the plant a composition which contains at least one compound which when in the presence of water yields anions of an acid conforming to the foregoing formula. Any such compound may be in the form of the acid per se or in chemically equivalent form, such as a water-soluble salt; such forms have the common property of yielding anions of the particular acid in the presence of water, and hence are considered to be equivalent for the production of plant response effects. Generically, the anions obtained upon dissolving the acids of this invention or their chemical equivalents in water may be represented by the formula

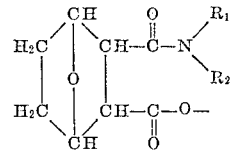

in which the meanings of $R_1$ and $R_2$ are the same as in the above formula which represents the acids.

Thus it will be seen that the acids are the active materials, and that this is so whether they are used as such or in chemically equivalent forms, such as water-soluble salts. These changes at the carboxyl group are mere changes in form rather than changes in substance.

Among the water-soluble salts of particular interest there may be mentioned sodium, potassium, calcium, strontium, magnesium, aluminum, iron, cobalt, nickel, zinc, cadmium, mercury, copper, ammonium, mono-, di-, and trialkylammonium, mono-, di-, and trialkanolammonium, mixed alkylalkanolammonium which is N-substituted by from 2 to 3 radicals of the type indicated, and mono- and dicycloalkylammonium salts, as well as salts of heterocyclic amines such as morpholine, piperidine, pyrrolidine, and hexamethyleneimine.

The alkylammonium salts such as monoalkylammonium, dialkylammonium, or trialkylammonium preferably have from 1 to 12 carbon atoms in each alkyl radical, the totality of carbon atoms preferably being not more than 12. The alkanolammonium salts such as monoalkanolammonium, dialkanolammonium, or trialkanolammonium preferably have from 2 to 3 carbon atoms in each alkanol group. The mixed alkylalkanolammonium salts such as monoalkyl monoalkanolammonium, dialkyl monoalkanolammonium, or monoalkyl dialkanolammonium preferably have from 1 to 4 carbon atoms in each alkyl group and from 2 to 3 carbon atoms in each alkanol group. The cycloalkylammonium salts such as monocycloalkylammonium and dicycloalkylammonium preferably have from 3 to 6 carbon atoms in each cycloalkyl radical, the totality of carbon atoms preferably being not more than 12.

Examples of monoalkylammonium salts are the monomethylammonium, monoethylammonium, monopropylammonium, monobutylammonium, monoamylammonium, monohexylammonium, monoheptylammonium, monooctylammonium, mononylammonium, monodecylammonium, monoundecylammonium, and monododecylammonium, and similar monoalkylammonium salts of acids of the invention.

Examples of dialkylammonium salts are the dimethylammonium, diethylammonium, dipropylammonium, dibutylammonium, diamylammonium, dihexylammonium, methylethylammonium, ethylpropylammonium, propylbutylammonium, butylamylammonium, amylhexylammonium, methylundecylammonium, and similar dialkylammonium salts of acids of the invention.

Examples of trialkylammonium salts are the trimethylammonium, triethylammonium, tripropylammonium, tributylammonium, methyldiethylammonium, ethyldipropylammonium, propyldibutylammonium, methyldiamylammonium, ethyldiamylammonium, methylethylpropylammonium, ethylpropylbutylammonium, and similar trialkylammonium salts of acids of the invention.

Examples of monoalkanolammonium salts are the monoethanolammonium, monopropanolammonium, and similar monoalkanolammonium salts of acids of the invention.

Examples of dialkanolammonium salts are the diethanolammonium, dipropanolammonium, ethanolpropanolammonium, and similar dialkanolammonium salts of acids of the invention.

Examples of trialkanolammonium salts are the triethanolammonium, tripropanolammonium, ethanoldipropanolammonium, propanoldiethanolammonium, and similar trialkanolammonium salts of acids of the invention.

Examples of monoalkyl monoalkanolammonium salts are the methylethanolammonium, ethylethanolammonium, propylethanolammonium, butylethanolammonium, methylpropanolammonium, ethylpropanolammonium, propylpropanolammonium, butylpropanolammonium, and similar monoalkyl monoalkanolammonium salts of acids of the invention.

Examples of dialkyl monoalkanolammonium salts are the dimethylethanolammonium, diethylethanolammonium, dipropylethanolammonium, dibutylethanolammonium, dimethylpropanolammonium, diethylpropanolammonium, dipropylpropanolammonium, dibutylpropanolammonium, methylethylethanolammonium, methylethylpropanolammonium, ethylpropylethanolammonium, ethylpropylpropanolammonium, propylbutylethanolammonium, propylbutylpropanolammonium, and similar dialkyl monoalkanolammonium salts of acids of the invention.

Examples of monoalkyl dialkanolammonium salts are the methyldiethanolammonium, ethyldiethanolammonium, propyldiethanolammonium, butyldiethanolammonium, methyldipropanolammonium, ethyldipropanolammonium, propyldipropanolammonium, butyldipropanolammonium, methylethanolpropanolammonium, ethylethanolpropanolammonium, propylethanolpropanolammonium, butylethanolpropanolammonium, and similar monoalkyl dialkanolammonium salts of acids of the invention.

Examples of monocycloalkylammonium salts are the cyclopropylammonium, cyclobutylammonium, cyclopentylammonium, cyclohexylammonium, and similar monocycloalkylammonium salts of acids of the invention.

Examples of dicycloalkylammonium salts are the dicyclopropylammonium, dicyclobutylammonium, dicyclopentylammonium, dicyclohexylammonium, cyclopropylcyclohexylammonium, and similar dicycloalkylammonium salts of acids of the invention.

Other substituted ammonium salts contemplated by the invention are those in which the ammonium radical is substituted by different radicals of the kind described above, such as the cyclohexyl-methylammonium, cyclohexyl-ethylammonium, cyclohexyl-hexylammonium, cyclopropyl-methylammonium, cyclopentyl-butylammonium, methyl-cyclohexyl-ethanolammonium, cyclohexyl-propanolammonium, and cyclohexyl-diethanolammonium salts of acids of the invention.

Preferred alkyl radicals for attachment to the amide nitrogen atom of the acids are those having from 1 to 12 carbon atoms, such as methyl, ethyl, propyl, butyl, amyl, hexyl, heptyl, octyl, nonyl, decyl, undecyl, and dodecyl. Preferred alkanol radicals for attachment to said amide nitrogen atom are those having from 2 to 3 carbon atoms, such as ethanol and propanol. Preferred cycloalkyl radicals for attachment to said amide nitrogen atom are those having from 3 to 6 carbon atoms, such as cyclopropyl, cyclobutyl, cyclopentyl, and cyclohexyl. Examples of polymethylene and oxapolymethylene radicals suitable for attachment to said amide nitrogen atom are tetramethylene, pentamethylene, hexamethylene, and 3-oxapentamethylene radicals. The totality of carbon atoms in such radical or radicals as may be attached to the amide nitrogen atom is preferably not more than 12.

Examples of acids of the invention are the parent acid, namely, 3,6 - endoxohexahydrophthalamic acid, and N-substituted acids as follows: N-methyl-, N-ethyl-, N-propyl-, N-butyl-, N-amyl-, N-hexyl-, N-heptyl-, N-octyl-, N-nonyl-, N-decyl-, N-undecyl-, N-dodecyl-, N,N-dimethyl-, N,N-diethyl-, N,N-dipropyl-, N,N-dibutyl-, N,N-diamyl-, N,N-dihexyl-, N-ethyl-N-methyl-, N-amyl-N-methyl-, N-methyl-N-octyl-, N-methyl-N-undecyl-, N - butyl - N - ethyl-, N-hexyl - N-propyl-, N-amyl - N - hexyl-, N-cyclopropyl-, N-cyclobutyl-, N-cyclopentyl-, N-cyclohexyl-, N,N-dicyclopropyl-, N,N-dicyclobutyl-, N,N-dicyclopentyl-, N,N-dicyclohexyl-, N-amyl-N-cyclopropyl-, N-cyclopropyl-N-hexyl-, N-cyclobutyl-N-methyl-, N-butyl-N-cyclobutyl-, N-cyclopentyl-N-methyl-, N-cyclopentyl-N-heptyl-, N-cyclohexyl-N-methyl-, N-cyclohexyl-N-ethyl-, N-cyclohexyl-N-propyl-, N-cyclohexyl-N-hexyl-, N-ethanol, N-propanol, N,N-diethanol, N,N-dipropanol, N-ethanol-N-propanol, N-methyl-N-ethanol, N-ethyl-N-ethanol, N-propyl-N-propanol, N-nonyl-N-propanol, N-amyl-N-ethanol, N-decyl-N-ethanol, N-cyclohexyl-N-ethanol, N-cyclohexyl - N - propanol, N-tetramethylene-, N-pentamethylene-, N-hexamethylene-, and N-3-oxapentamethylene - 3,6 - endoxohexahydrophthalamic acids.

Examples of salts of such acids have already been given.

Preparation of the 3,6-endoxohexahydrophthalamic acids may be accomplished by reacting exo-cis-3,6-endoxohexahydrophthalic anhydride with ammonia or a primary or secondary amine, reaction proceeding in accordance with the equation:

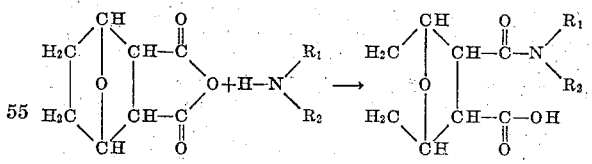

wherein $R_1$ and $R_2$ have the same meanings as in the formulas given above for the acids and the anions derivable therefrom.

Examples of primary and secondary amines which may be reacted with the above anhydride to yield the corresponding N-substituted 3,6-endoxohexahydrophthalamic acid are methylamine, ethylamine, propylamine, butylamine, amylamine, hexylamine, heptylamine, octylamine, nonylamine, decylamine, undecylamine, dodecylamine, dimethylamine, diethylamine, dipropylamine, dibutylamine, diamylamine, dihexylamine, methylethylamine, ethylpropylamine, propylbutylamine, butylamylamine, amylhexylamine, methylundecylamine, cyclopropylamine, cyclobutylamine, cyclopentylamine, cyclohexylamine, dicyclopropylamine, dicyclobutylamine, dicyclopentylamine, dicyclohexylamine, cyclopropylamylamine, cyclopropylhexylamine, cyclobutylmethylamine, cyclobutylbutylamine, cyclopentylmethylamine, cyclopentylheptylamine, cyclohexylmethylamine, cyclohexylethylamine, cyclohexylpropylamine, cyclohexylhexylamine, monoethanolamine, monopropanolamine, diethanolamine, dipropanolamine, ethanolpropanolamine, methylethanolamine, propylpropanolamine, nonylpropanolamine, amylethanolamine, decylethanolamine, ethylethanolamine, cyclohexylethanolamine, cyclohexylpropanolamine, pyrrolidine, piperidine, hexamethyleneimine, and morpholine.

Theoretically, if a free acid is desired, the anhydride and ammonia or amine as shown in the foregoing equation are brought together, conveniently in equimolar proportions, and mixed, such as by stirring, until reaction has taken place. The reaction may be conducted in aqueous or non-aqueous media, the latter being frequently preferred. Suitable non-aqueous media are those which are substantially inert toward the reactants and products, such as hexane, kerosene, benzene, toluene, xylene, etc. However, if a salt is obtained instead of a free acid, the latter may be obtained by treatment of the salt (e. g., in water solution) with a suitable inorganic acid such as hydrochloric acid or sulfuric acid.

Reaction occurs readily at ordinary temperature in many instances, while in others it is helpful to employ somewhat elevated temperatures, such as up to say 100° C., in order to speed the reaction. Temperatures appreciably greater than 100° C. are less preferred, because of the tendency of some of the products to decompose under such conditions.

A useful modification of the above procedure consists in employing two moles or more of ammonia or amine per mole of the anhydride, a salt being ordinarily obtained, particularly if the free acid as formed remains in solution. One mole of ammonia or amine serves to react with the anhydride to form the corresponding amide-acid as shown in the above equation, and a second mole of ammonia or amine serves to neutralize the acid so formed.

Salts may be obtained by preparing the appropriate free acid as described above, followed by neutralizing the acid with the same or a different amine. On the other hand, the free acid may be neutralized with an inorganic base. In many instances it is very convenient to omit isolation of the acid, carrying out the neutralization in the reaction mixture in which the acid was prepared. In other instances it may be desired to isolate the acid, and neutralize it in a separate step.

It will be understood that exo-cis-3,6-endoxohexahydrophthalic anhydride need not necessarily be reacted with a single base as defined in the above equation, but may be reacted with any desired mixture of such bases. In such cases, the resulting product obviously will be a mixture of compounds, except in the case of the use of a tertiary amine in the mixture, which ordinarily would act as a neutralizing agent only.

The following specific examples are illustrative of the preparation of the acids per se, and their equivalents.

EXAMPLE 1

One mole of exo-cis-3,6-endoxohexahydrophthalic anhydride was dissolved in 1 liter of toluene at 90° C. This solution, contained in a glass vessel provided with a stirrer, was cooled somewhat, and four moles of pure, dry, freshly distilled butylamine was slowly added with stirring, the temperature of the reaction mixture being maintained between 65° C. and 70° C. The amine was added over a period of about one hour. The mixture was then cooled to about 5° C. in order to cause the product to crystallize. The product was filtered off, washed successively with hexane and ether, and air-dried. The butylammonium N-butyl-3,6-endoxohexahydrophthalamate thus obtained weighed 269 g. as compared to a theoretical yield of 314 g. (86% yield). The melting point of this white, crystalline compound was found to be 141° C., with decomposition. The compound is very soluble in water.

EXAMPLE 2

Using the general procedure of Example 1, one mol of pure, dry, freshly distilled butylamine was added to a solution of one mole of exo-cis-3,6-endoxohexahydrophthalic anhydride in 500 ml. of hot toluene. During the reaction, the temperature of the mixture was maintained between 70° C. and 100° C. The mixture was cooled to about 5° C. and the resulting precipitate was recovered by filtration, washed with hexane, and air-dried. The precipitate which was obtained proved to be butylammonium N-butyl-3,6-endoxohexahydrophthalamate instead of the corresponding free acid, as shown by elementary analysis and melting point (140.5° C., with decomposition).

*Analysis.*—Calculated for $C_{16}H_{30}N_2O_4$: C, 61.14; H, 9.55; N, 8.92. Found: C, 60.37, 60.47; H, 9.36, 9.53; N, 8.70; 8.84.

A possible reason to assign to the formation of the salt in preference to free acid is that the reaction of neutralization is more rapid than the reaction which produces the acid.

EXAMPLE 3

Butylammonium N-butyl-3,6-endoxohexahydrophthalamate (150 g.) was dissolved in 300 ml. of distilled water, and the solution was cooled to 2° C. Concentrated hydrochloric acid (100 ml.) was added to this solution with external cooling and at such a rate that the temperature of the mixture did not exceed 10° C. White crystals of N-butyl-3,6-endoxohexahydrophthalamic acid precipitated, and were recovered by filtering the mixture at about 5° C. The product after being air-dried weighed 100 g. and melted at 131° C. with decomposition.

*Analysis.*—Calculated for $C_{12}H_{19}NO_4$: N, 5.81; neutral equivalent, 241. Found: N, 5.86, 5.86; neutral equivalent, 242.

EXAMPLE 4

Using the general procedure of Example 1, 552 g. (4.2 moles) of pure dibutylamine was gradually added to a stirred solution of 252 g. (1.5 moles) of exo-cis-3,6-endoxohexahydrophthalic anhydride in one liter of toluene, the temperature of the reaction mixture being maintained between 70° C. and 90° C. The mixture was then cooled to about 5° C., after which 3 liters of hexane was added, but no solid product was thus obtained. However, a fairly copious crop of white crystals was obtained when the mixture was allowed to stand at ordinary temperature for two days. This product, dibutylammonium N,N-dibutyl-3,6-endoxohexahydrophthalamate, was filtered from the liquid and air-dried. The compound is freely soluble in water and melts at 121–122° C.

*Analysis.*—Calculated for $C_{24}H_{46}N_2O_4$: C, 67.65;

H, 10.80; N, 6.57. Found: C, 67.73, 67.88; H, 10.73, 10.86; N, 5.98, 5.95.

EXAMPLE 5

Employing the general procedure of Example 1, pure diethylamine (146 g.) was slowly added, with stirring, to a solution of exo-cis-3,6-endoxohexahydrophthalic anhydride (84 g.) in toluene (200 ml.), the temperature of the reaction mixture being maintained between 60° C. and 90° C. Upon cooling the mixture to about 5° C., white crystals of diethylammonium N,N-diethyl-3,6-endoxohexahydrophthalamate precipitated. This product was recovered by filtration, washed with hexane, and dried. The product weighed 131 g. corresponding to a yield of 83%. It is quite soluble in water, and melts at 108–111.5° C. with decomposition.

*Analysis.*—Calculated for $C_{16}H_{30}N_2O_4$: N, 8.92. Found: N, 8.30, 8.40.

EXAMPLE 6

Benzene (2000 ml.) and exo-cis-3,6-endoxohexahydrophthalic anhydride (168 g., 1 mole) were introduced into a 3-liter, 3-neck flask fitted with reflux condenser, stirrer, and inlet tube for the introduction of gaseous ammonia. The benzene was refluxed until all the anhydride had dissolved. Introduction of gaseous ammonia was then commenced and was continued for 1¾ hours, the reaction mixture being refluxed throughout this period. The ammonia introduced to the reaction zone was more than sufficient to insure a stoichiometric quantity for formation of the desired salt. A white precipitate of ammonium 3,6-endoxohexahydrophthalamate formed as the reaction progressed. After the mixture had been cooled to room temperature, the above salt was recovered by filtration and air-dried. This product weighed 185 g. (91% yield).

*Analysis.*—Calculated for $C_8H_{14}N_2O_4$: N, 13.86. Found: N, 13.34, 13.39.

A portion of the above ammonium salt (80 g.) was dissolved in 400 ml. of water, and 50 ml. of concentrated hydrochloric acid was added to the solution. A white precipitate consisting of 3,6-endoxohexahydrophthalamic acid formed. It was filtered off, washed with water, and air-dried; 62 g. of the acid was thus obtained. The melting point was 192° C., with decomposition.

*Analysis.*—Calculated for $C_8H_{11}NO_4$: N, 7.57; neutral equivalent, 185. Found: N, 7.48; neutral equivalent, 185.

EXAMPLE 7

In this example, ammonium 3,6-endoxohexahydrophthalamate was prepared in an aqueous medium.

One mole of exo-cis-3,6-endoxohexahydrophthalic anhydride was added in small portions, with stirring, to 700 ml. of concentrated ammonium hydroxide contained in a flask. In order to insure an adequate supply of ammonia at all times, gaseous ammonia was bubbled into the mixture throughout the reaction period. After all the anhydride had been added, water was removed by evaporating the solution under reduced pressure at a temperature of about 40° C. to 60° C. The residue, consisting of ammonium 3,6-endoxohexahydrophthalamate, was a white, lumpy solid weighing 213 g. This product, after being dried, melted at 195° C., with decomposition.

A portion of this salt was converted to 3,6-endoxohexahydrophthalamic acid, essentially as described in Example 6. The acid thus obtained melted at 192.5° C., with decomposition.

EXAMPLE 8

Diisopropylamine (100 g.) was slowly added, with stirring, to a solution of exo-cis-3,6-endoxohexahydrophthalic anhydride (42 g.) in toluene, (200 ml.), using the general procedure of Example 1. The temperature of the reaction mixture was maintained between 75° C. and 87° C. As the reaction progressed, an oily phase rapidly separated and solidified. The reaction mixture was cooled and filtered to recover a white, solid product, which was dried; melting point, 144–147° C. with decomposition. The product had a neutral equivalent of 292; the theoretical value for N,N - diisopropyl-3,6-endoxohexadrophthalamic acid is 269. Thus the product was a mixture of this acid and its diisopropylammonium salt, the acid being present in greater amount than the salt. The reason ascribed for this is the almost immediate separation of the acid as an oily phase, whereas the amine present for salt formation remained dissolved in the other phase, i. e. in the toluene.

Although the applicants do not wish to be bound by any particular theory as to the mechanism whereby the above-described useful plant response effects are produced, experimentation has strongly indicated that said effects are brought about by the existence in aqueous media of anions such as are represented by the structural formula above. A salient feature of this theory is that any acid of the invention, whether applied as the acid per se or in other form to a living plant, makes the corresponding anions available to the plant.

The desired anions are made available by virtue of the fact that the acids per se, and their equivalent forms, are water-soluble and ionizable. Therefore, when such a compound is absorbed into the vascular system of a plant, it dissolves in the aqueous plant juices and provides the functioning anions. The resulting physiological activity is believed to be ascribable to the presence of the anions, whether or not assisted by the presence of any particular cation species. The acids per se and their other forms may thus be regarded as very convenient media for furnishing the desired anions to susceptible portions of the plant.

It follows, therefore, that the acids per se and their other forms are equally usable.

In actual practice it has been found that in certain applications in certain regions, such as arid regions, some forms of the acids are absorbed by the plant surfaces more efficiently than other forms. In humid regions, plants, such as cotton for instance, absorb the active ingredients more readily than in arid regions. In the latter regions it is better to apply an acid in the form of a water solution of a salt which does not tend to crystallize on leaf surfaces, such as an amine salt, and/or in admixture with an adjuvant, such as a wetting agent and/or humectant. However, it is to be understood that the active ingredient, irrespective of its physical form (e. g., in solution or as a dust), may be applied in some other way to assure its absorption by the plant, such as over or in a wounded surface, or by injection, or by direct application to the roots of the plant. Hence it may at times be a matter of choice and judgment as to the very best means of application of the particular compound in the particular region and for the particular purpose under consideration.

The acids per se have an appreciable solubility in water. The other forms are also soluble in water. Some of them are highly soluble. Others have a lesser degree of solubility. However, it is preferred to employ compounds having a solubility in water to the extent of at least 0.1% by weight, and still more particularly of at least 1% by weight.

From the foregoing it will be appreciated that for plant response purposes very low concentrations in applied aqueous solutions are effective.

The compounds are applied to the crop or plants in any desired manner, such as, in the form of a solid, for example by dusting, or in the form of a liquid, for example by spraying. They may also be employed by injection, such as into the stem of the plant, or at a point at which the epidermal layer is broken or wounded, or to the roots of the plant, or otherwise Compositions may be formulated by admixing the active ingredient with any desired liquid or solid carriers such as any of the finely divided solid carriers known in the dusting art, which are preferably of large surface area, such as a clay, for example, fuller's earth, pyrophyllite, talc, bentonite, kieselguhr, diatomaceous earth, etc. Any of the commercial clays on the market in finely divided form are highly satisfactory, and particularly those which are normally employed as insecticide carriers. Commercial clays, it will be understood, are generally identified by trade names (reflecting the source and mode of processing) of which Homer Clay, Celite, and Tripoli may be mentioned as typical.

Non-clay carriers which may be formulated with the active material include, for example, sulfur, volcanic ash, calcium carbonate, lime, by-product lignin, lignocellulose, flour such as wood, walnut shell, wheat, soybean, potato, cotton seed, etc.

Any desired mixture may be prepared by any suitable method. Thus, if a solid, the active material may be ground to a fine powder and tumbled together with the powdered carrier, or the carrier and the active agent may be ground together; alternatively, the active material in liquid form, including solutions, emulsions and suspensions thereof, may be admixed with the finely divided carrier in amounts small enough to preserve the requisite free-flowing property of the final dust composition. Or excess liquid may be removed such as by vaporization, for example, under reduced pressure.

When solid compositions are employed, in order to obtain a high degree of plant coverage with minimum poundage per acre, it is desirable that the composition be in finely divided form. Preferably the dust containing the active ingredient should be sufficiently fine that substantially all will pass through a 50 mesh sieve, and more particularly through a 200 mesh sieve. Excellent results have been obtained in which the dust composition consisted predominantly of particles in the range from 15 to 45 microns. Finer dusts, such as those consisting largely of particles in the range of 5 microns and below, have excellent covering capacity, but are somewhat more subject to drift, and are more expensive to prepare.

For spray application the active ingredient may be dissolved or dispersed in a liquid carrier such as water or an oil. Suitable oils for herbicidal application include those of petroleum, animal, vegetable, or synthetic origin, such as kerosene, fuel oil, lubricating oil, soybean oil, linseed oil, castor oil, sperm oil, cod liver oil, etc. For defoliation application, oils are usually selected which in themselves are relatively harmless to the plant.

Aqueous solutions or dispersions are economical and desirable. In general, the choice of the particular liquid carrier employed may be guided somewhat by prevailing circumstances, such as its availability, its solubility or dispersion characteristics toward the particular active agent employed, and/or its toxicity toward the plants undergoing treatment. In general, water is an excellent liquid carrier.

Thus spray formulations comprising the active ingredient in the form of a solution, suspension, or emulsion in aqueous or non-aqueous media may be employed.

Emulsions or dispersions of the active ingredient in the liquid carrier may be prepared by agitation of the agent with the carrier. This is commonly done at the time of spraying. Preferably, however, the agitation should take place in the presence of an emulsifying or dispersing agent (surface-active agent) in order to facilitate the preparation of said emulsion or dispersion. Emulsifying and dispersing agents are well known in the art, and include, for example, fatty alcohol sulfates, such as sodium laurylsulfate, aliphatic or aromatic sulfonates, such as sulfonated castor oil or the various alkarylsulfonates (such as the sodium salt of monosulfonated nonyl naphthalene), and nonionic types of emulsifying or dispersing agents such as the high molecular weight alkyl polyglycolethers or analogous thioethers, such as the decyl, dodecyl, and tetradecyl polyglycolethers and thioethers containing from 25 to 75 carbon atoms.

For convenience, the emulsifying or dispersing agent is mixed with the plant response agent prior to admixture with the carrier, and the preparation of the emulsion or dispersion is accomplished at the place where the spraying is to be undertaken merely by agitating said mixture with the carrier, particularly when aqueous. The plant response agent, if not soluble in the carrier in the concentration desired, may be dispersed as such, or may be dissolved in a solvent, and emulsified by agitation with the carrier. This applies particularly when water and oil are employed as the carrier.

The concentration of surface-active agent in the final emulsion or dispersion should be sufficient to make the phases readily dispersible, and in general for this purpose from 0.02% to 2% is satisfactory. Any desired additional amount may be added, such as for adjuvant purposes, as will be understood. Thus, if the surface-active agent is to be premixed with the plant response agent, the selected relative proportions of the two will largely depend upon the purposes in mind. For mere purposes of forming spray emulsions or dispersions, mixtures containing a surface-active agent to the extent of from about 1% to about 25% by weight of plant response agent are satisfactory. However, it is to be understood that the proportion may be varied over a wide range, particularly if pronounced adjuvant effects are desired.

Emulsifying and dispersing agents usually also possess the properties of wetting agents, and in this capacity greatly assist in bringing about efficient contact between liquid and the plant. The use, if desired, of adjuvants, such as wetting agents and/or humectants (water-retaining agents), is also contemplated in connection with solutions of the active ingredient, such as water solutions. Any suitable wetting agent and/or humectant may be employed for this purpose, such as the wetting agents more particularly referred to herein. Examples of humectants are glycerine, diethylene glycol, ethylene glycol, polyethylene glycols generally, and water-soluble sugars and sugar-containing mixtures, such as glucose, fructose, galactose, mannose, arabinose, xylose, sucrose, maltose, lactose, raffinose, trehalose, dextrins such as white dextrin, canary dextrin, British gum, etc., honey, molasses, maple syrup, maple sugar, and starch syrups such as corn syrup, etc.

For adjuvant purposes, any desired quantity of wetting agent may be employed, such as up to 250% or more based on active ingredient. For wetting purposes, the amount of adjuvant used may be considered to be that required to impart the desired wetting qualities to the spray solution as formulated, such as approximately 0.05% by weight of the spray solution. The use of considerably larger amounts is not based upon wetting properties, although present, but is a function of the physiological behavior of the wetting agent after spraying upon the plant.

It should be considered that once the solution has been sprayed upon the plant, the concentration of wetting agent existing upon the leaf is in no sense a function of the concentration existing in the original spray solution. Thus, evaporation might concentrate the wetting agent considerably, or the presence of a dew on the leaf surface, or of plant juices on the leaf surface might considerably dilute this agent. Spray rates normally run from 1 to 20 gallons per acre. Dews may vary from possibly 10 to 2000 gallons per acre.

Wetting agents appear to serve the multiple purposes of aiding in the penetration of the leaf surface by the active ingredients, spreading of the active ingredients over the leaf area, and retarding or preventing crystallization in the case of those forms of the active ingredients which show a tendency to crystallize when the spray dries.

Although the active ingredients may be applied to growing plants in concentrated form, it is usually desirable to employ liquid or solid formulations, for example as discussed above in which the active ingredients constitute less than 30% by weight of the total, such as less than 10% and even as low as 0.1%.

Other substances than the carrier and/or surface-active agent may be included in the solid or liquid formulations, if desired, to bring about various physical improvements such as the prevention of lumping during storage, or improvement in respect to coverage, moisture adsorption, adherence, etc. Likewise, other substances may be included in said formulations, if desired, to accomplish various physiological results. For example, it may at times be expedient to include singly or in combination substances such as fungicides, insecticides, bactericides, or types of plant response agents other than those agents discussed herein. The preparation of such additions and the materials added do not require elaboration, but will suggest themselves to persons skilled in the art upon becoming familiar herewith.

In practice of the process as applied to defoliation, the rate of application (i. e. the amount of active ingredient per crop unit) for best results will depend among other factors upon the species of plants being treated and upon their maturity.

As a rule the more mature the plant at the time of application, the less active material is required. In practice the crop is normally treated for defoliation purposes, 1 or 2 weeks prior to harvesting. In some instances, more than one application may be desirable, especially if heavy rains or winds should occur soon after the application, or to obtain an accumulative effect. Then too, in order to avoid possible injury to any particular crop, it may be desirable for an inexperienced operator to apply the defoliant initially at a relatively low rate, and to follow with a second application if necessary after observation of the first effects, to obtain the degree of defoliation desired.

Effective rates of application, for defoliation purposes, may sometimes be as low as 0.1 pound per acre when defoliating a susceptible plant at near maturity. Use of dosages greatly in excess of the minimum required for good defoliation may result in shock to the plant with attendant injury to the remainder of the plant.

In fact the plant response agents of the present invention are effective herbicides when used in amounts substantially greater than those required for defoliation, and they may be used advantageously for the killing of plants or vines (as in the case of potatoes) when desired, such as, for the killing of undesired plants, for example weeds or grasses, or for the killing of crops, irrespective of whether such undesired plants or crops are of species which lend themselves to defoliation.

Thus when defoliation is the objective the quantity applied should be sufficient to cause at least the major portion of the leaves to dry up and/or to drop from the living plant, but insufficient to cause substantial herbicidal action on the plant. On the other hand, when plant killing is the objective, any amount sufficient for this purpose may be applied. In the latter connection, since different species of plants vary markedly in their relative resistance to herbicidal action, selective killing of plant species may be practiced. Such selectivity may be varied by compounding, such as with adjuvants, for example, wetting agents.

The following examples illustrate the invention (generally and without limitation to the specific form of the active ingredients employed) as applied to the treatment of various plants to produce various plant responses including defoliation and herbicidal action.

In each example below, a group of plants was not treated and was kept as a control, the untreated group being similar to the treated group or groups. All plants (both treated and untreated) used for a test were of the same age and had been grown at the same time and under the same conditions. After the test was commenced, treated plants and untreated controls were again kept under the same conditions and therefore were subjected to comparable growing conditions. In all instances, the untreated controls grew normally.

EXAMPLE 9

Aqueous solutions containing 0.1% and 1.0%, respectively, of 3,6-endoxohexahydrophthalamic acid were prepared. 0.05 ml. aliquots of each of these solutions were injected by means of a small hypodermic needle into the hypocotyls of snapbean plants of medium size. One group of eight plants was treated with the 0.1% solution, and a similar group was treated with the 1.0% solution.

The plants were observed three days after treatment. The plants treated with the 0.1% solution were injured moderately and there was a fair amount of defoliation. All the plants in the group treated with the 1.0% solution were dead.

It has been demonstrated that bean plants such as those used herein, and even much younger plants, are not injured by the mere process of injection with a liquid containing no phytotoxic material. For example, 0.05 ml. aliquots of a 50% solution of acetone in water were injected into young bean plants by the above technique. Such treated plants have been observed for as long as nineteen days, and no injury was noted.

EXAMPLE 10

The following compounds were employed in this test, the capital letters being the designations by which the respective compounds are identified in Table 1 below:

A. Diethylammonium N,N-diethyl-3,6-endoxohexahydrophthalamate.
B. Dibutylammonium N,N-dibutyl-3,6-endoxohexahydrophthalamate.
C. N-butyl-3,6-endoxohexahydrophthalamic acid.
D. Butylammonium N-butyl-3,6-endoxohexahydropthalamate.

Aqueous solutions of known concentrations of the respective active ingredients were prepared. In the case of each solution, a 0.05 ml. aliquot was injected by the technique of Example 9 into each plant of a separate group comprising nine Dwarf Horticultural bean plants at the stage at which the first trifoliate leaf was still furled. From these data the dosage per plant of active ingredient was calculated.

Observations made four days after treatment are summarized in Table 1.

Several symbols are employed in this table, their meanings being as follows in this example and wherever applicable in the other examples:

lt=light or lightly.
mod=moderate or moderately
sev=severe or severely
bn=burned
ret=retarded
inj=injury
adh=adhering
C=untreated control
PL=primary leaves
TS=trifoliate shoots.

2S, for example, means each of two plants had a single primary leaf abscised; 4B, for example, means each of four plants had both primary leaves abscised.

TABLE 1

*Physiological effects*

| Compound | Active ingredient per plant | | | | |
|---|---|---|---|---|---|
| | 12 micrograms | 25 micrograms | 50 micrograms | 100 micrograms | 500 micrograms |
| A | 4B, 2S; adh PL—mod bn; lt stem inj; TS—mod ret. | Plants dying | Plants dying | Plants dead | Plants dead. |
| B | 5B, 1S; adh PL—mod bn; lt stem inj; TS—mod ret. | 6B; adh PL—mod bn; mod stem inj; TS—sev ret. | 9B; sev stem inj | do | Do. |
| C | 6B, 1S; adh PL—mod bn; mod stem inj; TS—mod ret. | 6B; adh PL—sev bn; mod stem inj; TS—mod ret. | 5B; adh PL frozen [1]; mod stem inj; TS—sev ret. | do | Do. |
| D | As C | As C | Lt stem inj | 4B, 1S; adh PL—sev dehydrated and frozen; sev stem inj; plants dying. | Do. |

[1] The term "frozen" as used to describe a condition of the leaves of a plant treated with a defoliant denotes that condition in which the leaves have undergone such a quick and drastic response that no abscission layer has formed. The leaves then cling tenaciously to the plant although the leaf blade and petiole are dead and shrivelled, and show no tendency to abscise. Thus, it is to be understood that "freezing" or "shrivelling" of leaves indicates a more phytotoxic condition than when the leaves actually abscise.

EXAMPLE 11

A group of nine Dwarf Horticultural bean plants at the stage at which the first trifoliate leaf was still furled was treated with 0.05 ml. aliquots of a 0.2% aqueous solution of N,N-diisopropyl-3,6-endoxohexahydrophthalamic acid, using the procedure of Example 9. Thus the dosage of active ingredient per plant was 100 micrograms.

Two days after treatment, many of the leaves of the plants were shrivelled and the stems were injured considerably; five days after treatment one plant was dying and the others were dead.

A similar experiment was conducted in which the dosage of the same active ingredient was 1000 micrograms per plant. All plants were dead two days after treatment.

EXAMPLE 12

Aqueous solutions of known concentrations of sodium N,N-diethyl-3,6-endoxohexahydrophthalamate were injected into Dwarf Horticultural bean plants at the stage at which the first trifoliate leaf was still furled, using the procedure of Example 9. Four groups of eight plants each were treated, and the concentrations of active ingredient in the solutions were such that the individual groups received the following respective dosages of active ingredient per plant: 6, 12, 25, and 50 micrograms.

Table 2 reports the condition of the plants three days after treatment.

TABLE 2

*Physiological effects*

| Active ingredient per plant | | | |
|---|---|---|---|
| 6 micrograms | 12 micrograms | 25 micrograms | 50 micrograms |
| As C | 2B; adh PL—lt bn; lt stem inj. | 5B; adh PL—mod shrivelled; mod stem inj. | 6B, 1S; adh PL—shrivelled; sev stem inj. |

EXAMPLE 13

Aqueous solutions of sodium N,N-diethyl-3,6-endoxohexahydrophthalamate of the following respective concentrations were spray-misted by means of a small De Vilbiss atomizer onto individual groups of thirty-two potted Dwarf Horticultural bean plants: 0.016%, 0.031%, 0.062%, 0.125%, and 0.25. The plants were at a stage of growth at which the first trifoliate leaf was still furled.

Each group of thirty-two plants was arranged uniformly in a 2 foot by 3 foot area, and 3 ml. of test solution was uniformly sprayed in the described manner onto the area. This rate of application corresponds to approximately 6 gallons per acre; this low volume rate simulates practical conditions of aeroplane spraying. Thus the amount of active ingredient was 0.125, 0.25, 0.5, 1.0, and 2.0 ounces, respectively, per acre.

Observations made three days after the plants were treated are given in Table 3.

EXAMPLE 14

Aqueous solutions of sodium N,N-diethyl-3,6-endoxohexahydrophthalamate were spray-misted by means of a small De Vilbiss atomizer onto individual plots of millet, a monocotyledon. The millet was young and had an average approximate height of 4 inches. The concentrations of active ingredient in the two test solutions employed were 0.25% and 1.0%, respectively, and both solutions contained 0.1% of a high molecular weight alkyl polyglycolthioether as a wetting agent.

Each plot had an area of 1.5 square feet, and 13 ml. of test solution was uniformly sprayed onto the area in the manner described. This rate of application corresponds to approximately 100 gallons per acre. Thus the dosage per acre of the active ingredient amounted to 2 pounds and 8 pounds, respectively.

In the case of both the lower and the higher dosages, all the millet was dead seven days after treatment.

By way of comparison, similar tests were conducted with 0.25% and 1.0% aqueous solutions of sodium trichloroacetate; both solutions contained 0.1% of the above wetting agent.

Seven days after treatment, the plot of millet which was treated with the 0.25% solution of sodium trichloroacetate showed only light injury. Approximately one-fourth of the plants were dead and the others were considerably injured in the plot treated with the 1.0% solution.

EXAMPLE 15

Compounds employed in this test were as follows, the capital letters identifying the compounds in Table 4 below:

A. Diethylammonium N,N-diethyl-3,6-endoxohexahydrophthalamate.

B. Dibutylammonium N,N-dibutyl-3,6-endoxohexahydrophthalamate.

C. N-butyl-3,6-endoxohexahydrophthalamic acid.

Aqueous solutions having the following concentrations of these respective active ingredients were prepared: 0.0006%, 0.00125%, 0.0025%, 0.005%, and 0.0075%.

These solutions were applied to potted young Dwarf Horticultural bean plants at a growth stage at which some of the first trifoliate leaves were still furled and others were unfurling. Separate groups of eight such plants were dipped to the first nodes into the respective test solutions, and the excess solution was shaken off. Approximately 2 ml. of solution remained on each plant. Thus the dosage per plant of active ingredient, depending on the concentrations of the test solutions, was approximately 12, 25, 50, 100, and 150 micrograms, respectively.

Observations were made three days after treatment and are summarized in Table 4.

TABLE 3

*Physiological effects*

| Active ingredient, ounces per acre | | | | |
|---|---|---|---|---|
| 0.125 | 0.25 | 0.5 | 1.0 | 2.0 |
| As C | As C | PL—lt bn; otherwise as C. | 2B, 3S; adh PL—lt bn. | 6B, 7S; adh PL—mod bn. |

TABLE 4
Physiological effects

| Compound | Active ingredient per plant | | | | |
| --- | --- | --- | --- | --- | --- |
| | 12 micrograms | 25 micrograms | 50 micrograms | 100 micrograms | 150 micrograms |
| A | 4S; adh PL—some lt bn, some as C. | 2B, 3S; adh PL—mod bn. | 5B, 3S; adh PL—mod bn. | 5B; adh PL—frozen. | 4B, 2S; adh PL—frozen. |
| B | 2S; adh PL—lt bn. | PL—lt bn. | 3B, 2S; adh PL—mod bn. | 8B | 7B; adh PL—shrivelled and frozen. |
| C | As C | As C | 3S; adh PL—lt bn. | 3B, 1S; adh PL—mod bn. | 5B; adh PL—sev bn. |

From the foregoing it can be seen that the acids used in the practice of this invention, whether used per se or in chemically equivalent form, are highly effective in regulating the growth characteristics of viable or living plants, and particularly of plants having vascular systems. For example, the acids may be employed to hasten defoliation of plants which defoliate naturally, or may be employed to terminate the life cycle of plants, or may be employed to retard the growing of seeds, or may be employed to selectively stunt or terminate the growth of certain unwanted plants to facilitate and favor the growth of wanted plants, or may be employed to terminate the growth of vines in favor of, or to facilitate harvesting of, the fruits of such vines, etc. Other applications of the invention in the regulation of the growth characteristics of plants will occur to persons skilled in the art upon becoming familiar herewith.

Accordingly, it is to be understood that the particular description is by way of illustration and that the patent is intended to cover by suitable expression in the claims whatever features of novelty reside in the invention.

This application is a continuation-in-part of our co-pending application Serial No. 81,026, filed March 11, 1949, which has matured into Patent No. 2,576,080, granted November 20, 1951.

We claim:

1. A method for inducing response in a living plant having a vascular system, comprising bringing into association with said vascular system of said plant an effective amount of anions of exo-cis configuration and conforming to the structure

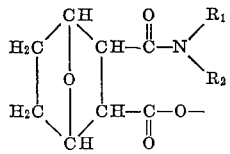

in which $R_1$ and $R_2$ taken individually represent one of the group consisting of hydrogen and alkyl, alkanol, and cycloalkyl radicals, and taken collectively represent one of the group consisting of polymethylene and oxapolymethylene radicals.

2. A method for inducing response in a living plant which comprises applying to the surface of said plant in amount sufficient to produce said response at least one compound which when in the presence of water yields anions of exo-cis configuration and conforming to the structure

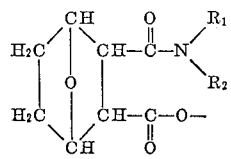

in which $R_1$ and $R_2$ taken individually represent one of the group consisting of hydrogen and alkyl, alkanol, and cycloalkyl radicals, and taken collectively represent one of the group consisting of polymethylene and oxapolymethylene radicals.

3. The process of claim 2 in which an applied compound is dimethylammonium exo-cis-N,N-dimethyl-3,6-endoxohexahydrophthalamate.

4. The process of claim 2 in which an applied compound is diethylammonium exo-cis-N,N-diethyl-3,6-endoxohexahydrophthalamate.

5. The process of claim 2 in which an applied compound is dibutylammonium exo-cis-N,N-dibutyl-3,6-endoxohexahydrophthalamate.

6. The process of claim 2 in which an applied compound is exo-cis-N,N-diethyl-3,6-endoxohexahydrophthalamic acid.

7. The process of claim 2 in which an applied compound is exo-cis-N,N-diisopropyl-3,6-endoxohexahydrophthalamic acid.

8. A composition prepared for use as a plant response agent which comprises a carrier, and at least one compound which when in the presence of water yield anions of exo-cis configuration and conforming to the structure

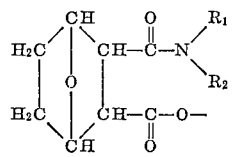

in which $R_1$ and $R_2$ taken individually represent one of the group consisting of hydrogen and alkyl, alkanol, and cycloalkyl radicals, and taken collectively represent one of the group consisting of polymethylene and oxapolymethylene radicals.

9. A composition prepared for use as a plant response agent which comprises a carrier and dimethylammonium exo-cis-N,N-dimethyl-3,6-endoxohexahydrophthalamate.

10. A composition prepared for use as a plant response agent which comprises a carrier and diethylammonium exo-cis-N,N-diethyl-3,6-endoxohexahydrophthalamate.

11. A composition prepared for use as a plant response agent which comprises a carrier and dibutylammonium exo-cis-N,N-dibutyl-3,6-endoxohexahydrophthalamate.

12. A composition prepared for use as a plant response agent which comprises a carrier and exo-cis-N,N-diethyl-3,6-endoxohexahydrophthalamic acid.

13. A composition prepared for use as a plant response agent which comprises a carrier and exo-cis - N,N - diisopropyl - 3,6 - endoxohexahydrophthalamic acid.

NATHANIEL TISCHLER.
ERNEST P. BELL.

References Cited in the file of this patent

UNITED STATES PATENTS

| Number | Name | Date |
|---|---|---|
| 2,524,145 | Tawney | Oct. 3, 1950 |
| 2,556,665 | Smith | June 12, 1951 |

OTHER REFERENCES

"Organic Chemistry," Fieser and Fieser, 2nd edition (1950), page 699, D. C. Heath and Co., Boston